United States Patent [19]

Drits

[11] Patent Number: 4,854,161

[45] Date of Patent: Aug. 8, 1989

[54] METHOD FOR DIAGNOSING CUTTING TOOL DULLNESS

[75] Inventor: Vladimir Drits, Minnetonka, Minn.

[73] Assignee: Innovex Inc., Hopkins, Minn.

[21] Appl. No.: 212,563

[22] Filed: Jun. 28, 1988

[51] Int. Cl.$^4$ .............................................. G01N 3/58
[52] U.S. Cl. ...................................................... 73/104
[58] Field of Search ............................ 73/104, 866, 7; 340/680

[56] References Cited

U.S. PATENT DOCUMENTS

| | | | |
|---|---|---|---|
| 3,889,520 | 6/1975 | Stöferle et al. .................. | 73/104 X |
| 4,563,897 | 1/1986 | Moore .............................. | 73/104 X |
| 4,644,335 | 2/1987 | Wen ................................. | 73/104 X |

OTHER PUBLICATIONS

Jetly, S., "Measuring Cutting Tool Wear On-Line: Some Practical Considerations", *Manufacturing Engineering*, Jul. 1984, pp. 55-60.

Quinlan, Joseph C., "New Tool-Wear Sensors Aid Adaptive Machining", *Tooling & Precision*, Dec. 1987, pp. 41-43.

*Primary Examiner*—Tom Noland
*Attorney, Agent, or Firm*—Kinney & Lange

[57] ABSTRACT

A method for determining wear or dullness of a cutting tool used to machine a surface of a workpiece. Cutting tool dullness is determined as a function of a plurality of work-hardening values of the machined surface. Each work-hardening value is computed as a function of different and separately measured parameters. The workpiece is characterized as being excessively worn if all of the separately computed work-hardening values are greater than a threshold value.

4 Claims, 2 Drawing Sheets

METHOD FOR DIAGNOSING CUTTING TOOL DULLNESS

BACKGROUND OF THE INVENTION

1. Field of the Invention.

The present invention relates generally to apparatus and methods for determining the dullness of cutting tools used in metal machining operations. In particular, the present invention is a method for determining cutting tool dullness as a function of cutting tool-caused changes in properties of the machined surface.

2. Description of the Prior Art.

In both automatic and manual machining operations it is important to know the degree of wear or dullness of the cutting tool. Since cutting tools are expensive, and productivity is lost while they are being replaced, it is desirable to use the tool as long as possible. On the other hand, dull cutting tools result in inefficient machining operations and workpieces which do not meet required specifications.

Quite a few different methods for monitoring cutting tool dullness are currently used. These methods are disclosed in articles entitled, "Measuring Cutting Tool Wear On-Line: Some Practical Considerations", *Manufacturing Engineering*, July 1984, pages 55–60; and "New Tool-Wear Sensors Aid Adaptive Machining", *Tooling and Precision*, December 1987, pages 41–43. The methods disclosed in these articles are characterized as being either direct or indirect methods. Indirect methods include force measurement, temperature measurement, vibration measurement, and sound measurement techniques. Direct methods use workpiece size change, radiometric, tool/work junction electrical resistance, and optical monitoring.

In view of the large number of methods currently used to diagnose cutting tool dullness, it is evident that none of them have the qualities needed for all situations. There is, therefore, a continuing need for new methods for monitoring cutting tool wear. To be useful the method must be quick, accurate and reliable.

SUMMARY OF THE INVENTION

The present invention is a method for determining wear of a cutting tool as a function of work-hardening values of a machined surface of a workpiece. A cutting tool-caused change in a first parameter of the machined surface of the workpiece is measured. A first work-hardening value of the machined surface is then calculated as a function of the measured change in the first parameter. A cutting tool-caused change in a second parameter of the machined surface is also measured, and a second work-hardening value calculated as a function of the second parameter. Wear of the cutting tool is then characterized as a function of the first and second work-hardening values. In a preferred embodiment the first and second work-hardening values are compared to a work-hardening threshold value characteristic of a worn cutting tool. The cutting tool is characterized as being excessively worn only if both the first and second work-hardening values are greater than the work-hardening threshold value.

The cutting tool dullness monitoring method of the present invention can be quickly and easily implemented using a variety of known techniques for monitoring work-hardening. Even though any one particular method for determining work-hardening can have inherent inaccuracies, decisions made as a function of a plurality of work-hardening values, that is, two or more values based upon different sensed parameters will be relatively accurate.

DETAILED DESCRIPTION OF THE PREFERRED EMBODIMENTS

The present invention is a method which utilizes calculated work-hardening values based upon measurements of a machined surface to determine whether a cutting tool used on the surface is so worn or dull as to need replacing. Work-hardening values characterize the increased hardness accompanying plastic deformation of a metal workpiece below its recrystallization temperature range. A sharp cutting tool causes a minimum amount of work-hardening on the machined surface. As a tool becomes less sharp, the level of work-hardening increases. By establishing an acceptable value of work-hardening, a limit for acceptable wear or dullness for the cutting tool can also be determined.

A variety of techniques for determining work-hardening, also known as residual stress, are known. Work-hardening values can be computed from both direct and indirect measurements of changes in parameters or properties of the machined surface. By way of example, direct measurement techniques can utilize changes in specific thermal capacity or changes in the modulus of elasticity. Changes in x-ray crystallography, changes in workpiece permeability, and changes in resistance to eddy currents are indirect measurements which can be used to compute work-hardening. Because of inherent inaccuracies in these measurement techniques, the work-hardening values computed therefrom, and therefore the use of any one of these values to characterize tool dullness, are also relatively inaccurate. However, relatively accurate determinations can be made when based upon a number of work-hardening values, each computed from a separately measured cutting tool-caused parameter change.

Figure 1:
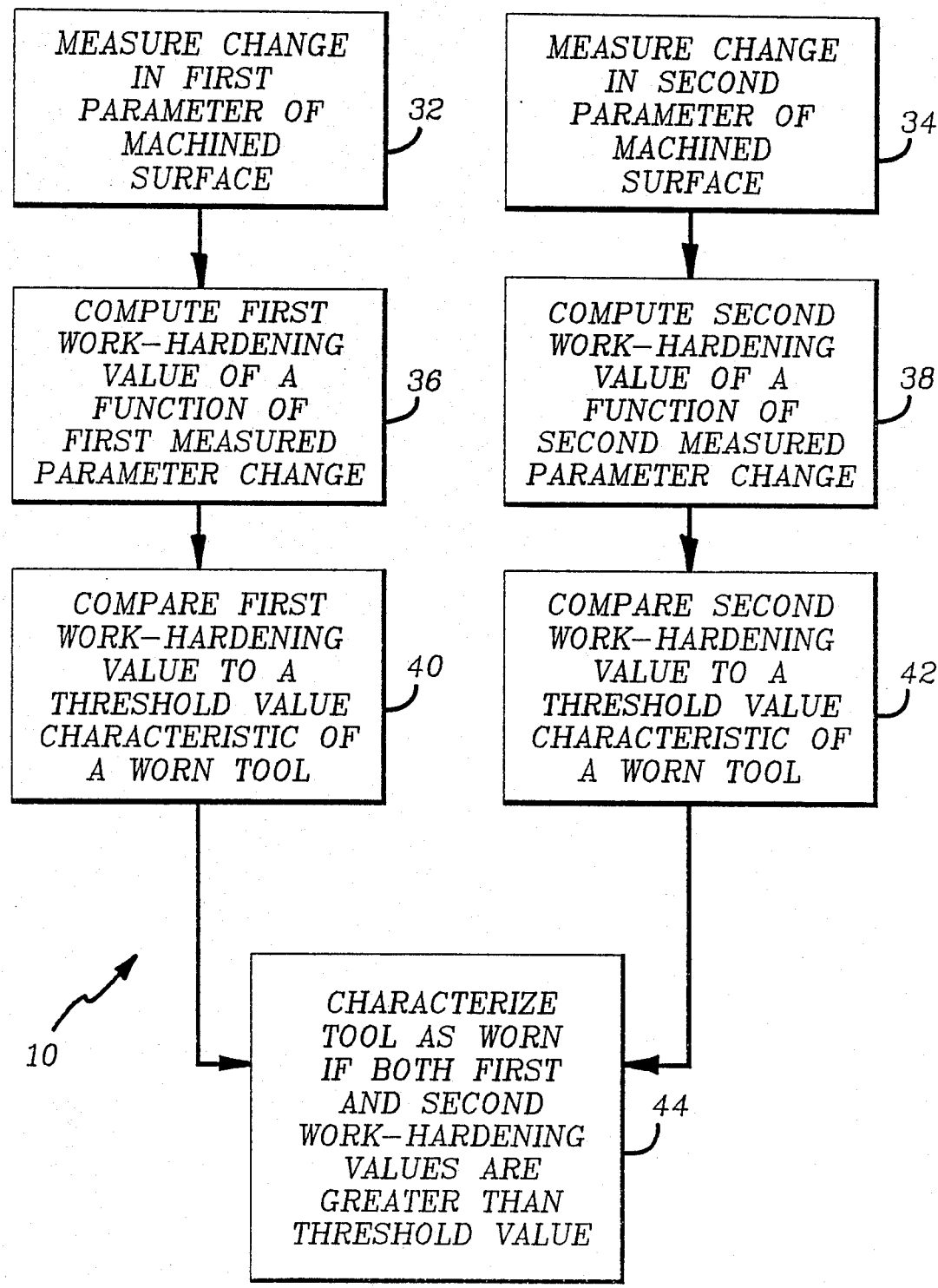
FIG. 1 is a flowchart of a method in accordance with the present invention for determining cutting tool dullness.
Figure 2:
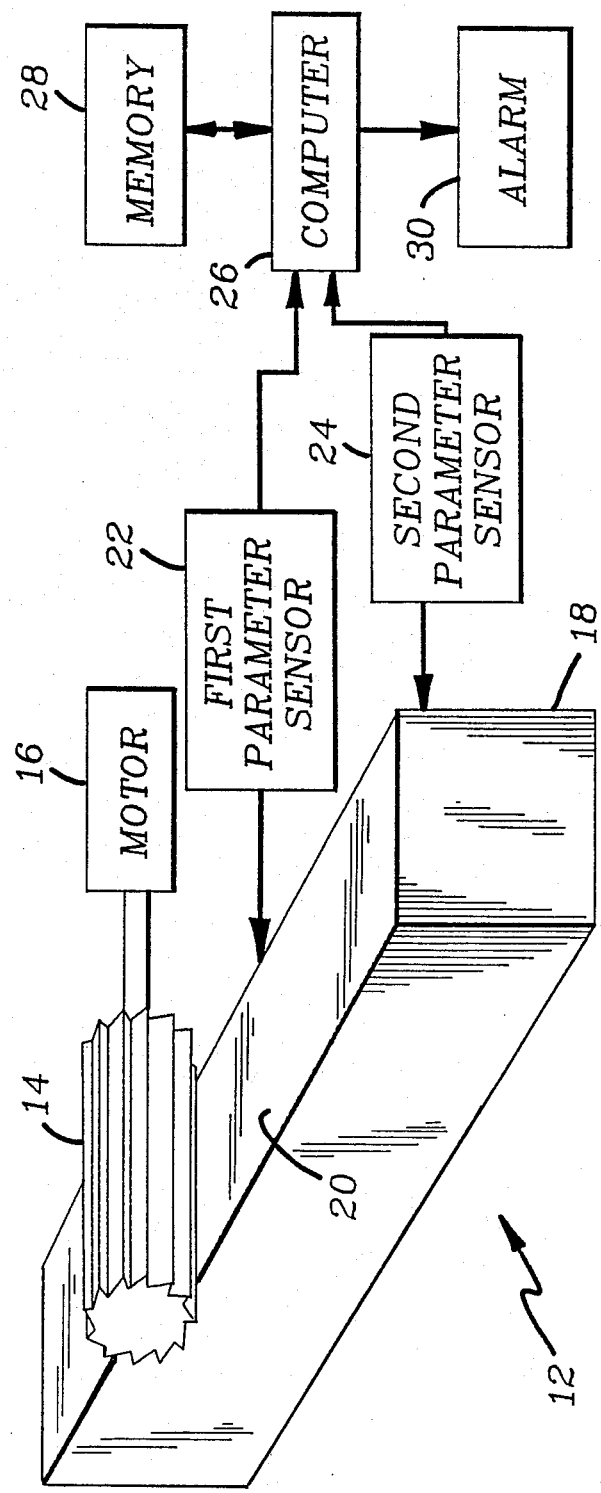
FIG. 2 illustrates a workpiece being machined by a cutting tool, as well as apparatus for implementing the method shown in FIG. 1.

A cutting tool dullness diagnosing method 10 in accordance with the present invention is illustrated generally in FIG. 1. In one embodiment, method 10 is implemented on a machining system 12 which is illustrated in FIG. 2. Machining system 12 includes a cutting tool 14 which is driven by motor 16. Metal workpiece 18 is forced into cutting tool 14 by a feed mechanism (not shown), causing the cutting tool to machine surface 20. System 12 also includes first parameter sensor 22, second parameter sensor 24, computer 26, memory 28 and alarm 30. Additional parameter sources can be used as well.

Dullness diagnosing method 10 can be implemented while the machining operation on workpiece 18 is taking place, or after it has been completed. As indicated by steps 32 and 34, cutting tool-caused changes in first and second parameters of machined surface 20 are measured or otherwise monitored by means of first and second parameter sensors 22 and 24, respectively. Parameter sensors 22 and 24 can be any known device for making measurements of the type described above from which work-hardening values of machined surface 20 can be computed. Data characteristic of the measured changes in the first and second parameters is then fed to computer 26. Computer 26 computes a first work-hardening value as a function of the measured change in the first parameter, and a second work-hardening value as a function of the measured change in the second parameter. These steps are described generally at 36 and 38 in FIG. 2. Formulas and other information required by computer 26 to compute the work-hardening values from the measured changes in accordance with known techniques can be stored in memory 28.

Also stored in memory 28 is a work-hardening threshold value characteristic of a worn cutting tool 14. When the computed work-hardening values of machined surface 20 are less than or equal to the threshold value, it is assumed that cutting tool 14 is still sufficiently sharp to efficiently machine workpiece 18. Should the work-hardening values of machined surface 20 be greater than the threshold value, it is assumed that cutting tool 14 is so worn that it cannot properly carry out its function.

In view of the inherent errors in any one given work-hardening value, method 20 makes use of both the first and second work-hardening values to determine whether or not cutting tool 14 is worn. As indicated at steps 40 and 42, computer 26 compares the first work-hardening value to the threshold value, and also compares the second work-hardening value to the threshold value. Cutting tool 14 is characterized as being worn only if both the first and second work-hardening values are greater than the threshold value. Should this determination characterize cutting tool 14 as being worn as indicated at step 44, computer 26 can actuate alarm 30. Alarm 30 can be any visual or audible-type alarm which indicates to an operator that cutting tool 14 should be replaced.

Dullness diagnosing method 10 will preferably be repeatedly implemented on a periodic basis. The frequency with which method 10 must be repeated will be determined by a variety of factors including the hardness of workpiece 18, and the type of cutting tool 14 which is being used.

Other functional relationships between the computed work-hardening values can also be used to determine whether or not cutting tool 14 should be replaced. By way of example, the work-hardening values can be correlated. Alternatively, the tool can be replaced if any of the calculated work-hardening values exceed the threshold value.

Although the present invention has been described with reference to preferred embodiments, workers skilled in the art will recognize that changes may be made in form and detail without departing from the spirit and scope of the invention.

What is claimed is:

1. A method for determining wear of a cutting tool used to machine a surface of a workpiece, including:
   measuring a change in a first parameter of a machined surface of a workpiece caused by a cutting tool;
   calculating a first work-hardening value of the machined surface of the workpiece as a function of the measured change in the first parameter;
   measuring a change in a second parameter of the machined surface of the workpiece caused by the cutting tool;
   calculating a second work-hardening value of the machined surface of the workpiece as a function of the measured change in the second parameter; and
   characterizing wear of the cutting tool as a function of the first and second work-hardening values.

2. The method of claim 1 wherein characterizing wear of the cutting tool as a function of the first and second work-hardening values includes:
   comparing the first work-hardening value to a work-hardening threshold value characteristic of a worn cutting tool;
   comparing the second work-hardening value to a second work-hardening threshold value characteristic of a worn cutting tool; and
   characterizing the cutting tool as excessively worn as a function of the comparisons of the respective first and second work-hardening values to the respective work-hardening threshold value.

3. The method of claim 1 wherein measuring the change in the first and second parameters includes measuring the changes as the surface of the workpiece is being machined.

4. A method for determining dullness of a cutting tool used to machine a surface of a workpiece, including:
   measuring cutting tool-caused changes in a plurality of parameters of a machined surface of a workpiece;
   computing work-hardening values of the machined surface as a function of the measured changes; and
   characterizing cutting tool dullness as a function of the computed work-hardening values.

* * * * *